United States Patent Office 3,159,783
Patented Dec. 1, 1964

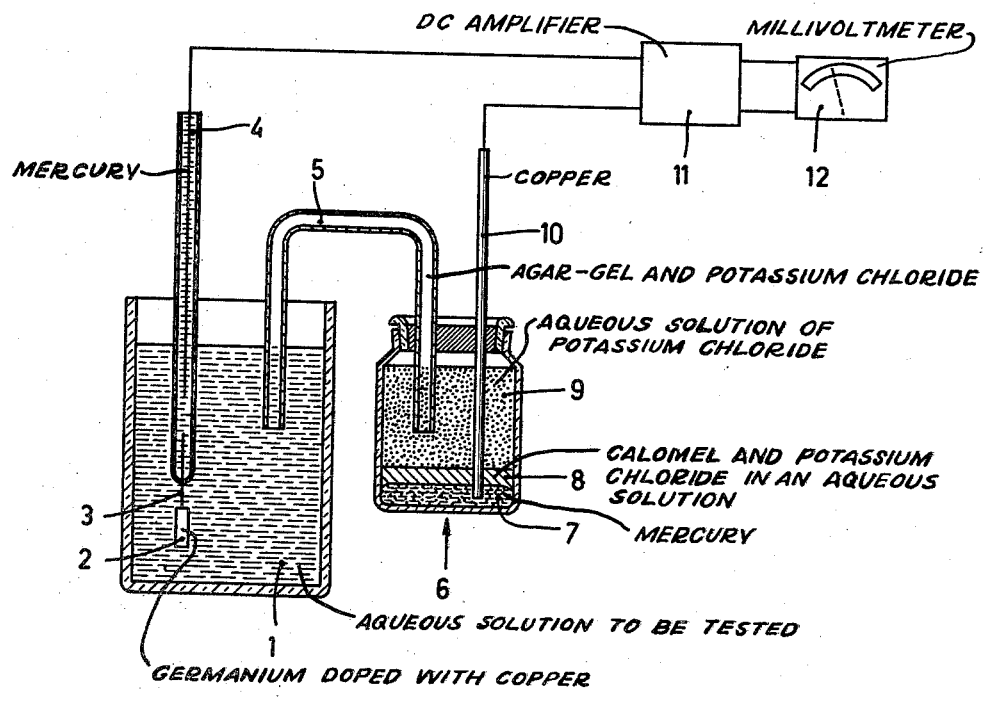

3,159,783
DEVICE FOR MEASURING ION CONCENTRATIONS WITH A COPPER DOPED GERMANIUM ELECTRODE
Marcus Johannes Sparnaay and Wilhelmina Hendrika Petronella Wensing, both of Emmasingel, Eindhoven, Netherlands, assignors to North American Philips Company, Inc., New York, N.Y., a corporation of Delaware
Filed Sept. 17, 1963, Ser. No. 309,498
Claims priority, application Netherlands Sept. 21, 1962
2 Claims. (Cl. 324—30)

This invention relates to a device for measuring H-ion concentrations.

Such a device is known of the type comprising a glass electrode and a reference electrode between which, when placed in a solution, an E.M.F. is formed which is a function of the H-ion concentration. The E.M.F. is used, after amplification, either for measuring or recording the H-ion concentration, or delivering a warning signal when a critical value thereof is reached, or as a control voltage for operating a proportioning mechanism for the control of the H-ion concentration. The glass electrode suffers from several drawbacks, such as the vulnerability because of the low mechanical strength and especially the high internal resistance of about 10 to 100 megohms which necessitate an amplification of the voltage set up between said electrode and the reference electrode, during which process only an extremely small current is derived from the pair of electrodes. Such an amplifier needs a so-called dynamic capacitor at its input, thus rendering the amplifier complicated.

Also an antimony electrode is used as a hydrogen electrode in such a device. Such an electrode, in turn, suffers from other disadvantages which render it even less attractive than the glass electrode. A variety of oxidation products are formed on the antimony surface, resulting in poor reproducibility and high inaccuracy because of the sensitivity to redox couples. The Sb electrode is, in addition, sensitive to sulphides and in a chloride medium it is not usable due to the formation of antimonyoxychloride (SbOCl).

It is known that germanium in solutions of germanium ions exhibits a large number of electrode potential functions dependent upon the pH value as a result of as many electrode reactions possible. In contrast to what could be expected, applicant has found that a germanium crystal is as a hydrogen electrode exhibits a fairly good linear relationship between the electrode potential, with for example a calomel electrode as the reference electrode, and the pH value. However, since the potential was found to be greatly dependent on varying kinds and quantities of foreign ions in the solution to be measured, germanium in itself is in practice not suitable as a hydrogen electrode.

The present invention provides a solution of this problem of poor reproducibility which was encountered by the applicants during the experiments. The invention provides a device for measuring the H-ion concentration obtained with the aid of a measuring electrode of a compact and mechanically rigid structure, which is substantially insensitive to redox couples and to foreign ions in the solution to be measured, which is not attacked by any reagent and which has an exceptionally low internal resistance.

The device according to the invention comprises the measuring electrode of germanium, doped with about 0.001 to 1 mol percent of Cu and a reference electrode known per se, which two electrodes are connected through current conductors to a device, likewise known per se, for measuring the E.M.F. set up between said electrodes.

In the appendant drawing a device according to the invention for measuring the hydrogen ion concentration has been shown schematically. The solution to be measured 1 contains the measuring electrode 2, consisting of germanium containing a dope of 0.001 to 1 mol percent of Cu, immersed into it. The germanium electrode has been affixed to a platinum wire 3, which other end has been molten in a glass-tube 4, filled with mercury to ensure a perfect electrical contact with the current-wire. The solution to be measured comprises further immersed in it one limb of an U-shaped salt-bridge 5, which has been filled with an electro-conductive gelatinous mass, consisting of an agar-gel saturated with potassium chloride. The other limb of the salt-bridge has been immersed into a saturated calomel electrode 6, used as reference electrode, comprising a layer of metallic mercury 7, a pasty mass consisting of a mixture of calomel ($Hg_2Cl_2$), potassium chloride and water 8 and a saturated aqueous solution of potassium chloride 9. A copper wire 10 has been inserted into the electrode-vessel, making contact with the mercury-layer. To the part of the copper wire, extending from the electrode-vessel, the current-wire has been attached. The two current wires, attached to the electrodes have been plugged into the input of a known type of D.C.-amplifier 11, not shown in detail, whereas the output of the D.C.-amplifier has been connected to a millivoltmeter 12.

The E.M.F. read on the millivoltmeter is directly proportional to the pH of the aqueous solution. Due to the fact, that the internal resistance of the germanium-electrode is low, a reasonable current can be made flowing through the circuit, on account of which a simple D.C.-amplifier can be dispensed with in order to make it possible to determine the pH with a high sensitivity.

Doping germanium with copper is known per se. This is preferably effected by depositing copper on the surface of a germanium crystal, for example by electro-deposition, subsequently heating the crystal to a temperature of about 700° C. and then chilling to room temperature.

The germanium electrode is preferably made in a crystalline form, either as a monocrystal or as a polycrystalline body.

The semi-conductive germanium doped within the scope of the invention has a specific conductivity of about 0.01 ohm-cm. and has so-called n-type conduction.

It has been found that it is precisely the n-type conduction, which is advantageous in view of the provision of an ohmic contact on the germanium electrode for connection to the measuring or regulating device.

The measuring electrode in the device according to the invention may have a very small size. By means of such a device it is possible in a simple manner to carry out measurements of the H-ion concentration in the living organism. The measuring electrode is then used as such, for example, for measurements of the H-ion concentration of the contents of the stomach, or it is incorporated into a hollow injection needle, for example for measurements in blood vessels, whereas the reference electrode is held in the mouth of the test person. Such measurements have been carried out hitherto with the use of glass electrodes, which was not particularly attractive.

The germanium electrode is suitable for measurements in a variety of media. In practice it is unusable only in a strong alkaline medium, above a pH-value of 10, and in a medium containing concentrated fluoride. The glass electrode and the antimony electrode also suffer from the same limitations.

Due to the low internal resistance of the germanium electrode, the amplifying equipment used with the device according to the invention can be considerably less complicated since much greater current strengths are permissible than in the case, for example, where a glass electrode is used.

*Example*

A germanium monocrystal in the form of a small rod which is 20 mm. long and 2 mm. in diameter was covered by electro-deposition with a thin layer of Cu 10 microns thick. Then the crystal was heated in a reducing atmosphere at a temperature of 700° C. for two hours and subsequently chilled in water or air to room temperature. The germanium now contained 0.01 mol percent of copper, corresponding to $10^{19}$ Cu atoms per cm.$^3$.

Said crystal was subsequently soldered to a copper rod and used as a measuring electrode in solutions having different pH values. The reference electrode employed was a 0.1 to 1 n-saturated calomel electrode. The E.M.F. set up between these electrodes was measured with the aid of a "Philips" pH-meter type PF9400. The following solutions were measured:

| pH | E.M.F. (mv.) | $\Delta E/\Delta pH$ |
|---|---|---|
| 4.00 | −192 | |
| | | 43 |
| 4.83 | −228 | |
| | | 35 |
| 6.89 | −300 | |
| | | 34 |
| 8.14 | −342 | |
| | | 26 |
| 9.20 | −369 | |

In solutions having the same pH value, to which varying amounts of $Ag^+$, $Au^{+++}$, $Cu^{++}$, $Fe^{++}$ and $Ni^{++}$-ions up to 0.1 gram-ion/litre, had been added E.M.F. values were measured which differed from the solutions without foreign ions up to only a few millivolts.

What is claimed is:
1. A device for measuring H-ion concentrations, comprising a measuring electrode and a reference electrode, which two electrodes are connected through current conductors to a device for measuring the electromotive force set up between the electrodes, wherein the measuring electrode consists of germanium doped with about 0.001 to 1 mole percent of copper.
2. The device of claim 1 wherein the germanium is a monocrystal.

No references cited.